(12) United States Patent
Hämäläinen

(10) Patent No.: US 6,775,397 B1
(45) Date of Patent: Aug. 10, 2004

(54) METHOD AND APPARATUS FOR USER RECOGNITION USING CCD CAMERAS

(75) Inventor: Jani Hämäläinen, Toronto (CA)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/512,489

(22) Filed: Feb. 24, 2000

(51) Int. Cl.⁷ .................................................. G06K 9/00
(52) U.S. Cl. ...................... 382/118; 382/154; 340/5.83; 345/419
(58) Field of Search ................................. 382/115, 118, 382/154, 285; 351/204; 235/380; 340/5.52, 5.53, 5.82, 5.83, 5.84; 356/71, 601, 603, 611; 345/420, 419

(56) References Cited

U.S. PATENT DOCUMENTS

| | | | |
|---|---|---|---|
| 5,202,928 A | 4/1993 | Tomita et al. ............... | 382/154 |
| 5,671,343 A | 9/1997 | Kondo et al. ................ | 345/419 |
| 5,694,483 A | 12/1997 | Onoguchi .................... | 382/154 |
| 5,819,016 A | 10/1998 | Watanabe et al. ........... | 345/419 |
| 6,028,672 A * | 2/2000 | Geng ......................... | 356/602 |
| 6,111,517 A * | 8/2000 | Atick et al. ................. | 340/5.83 |
| 6,377,700 B1 * | 4/2002 | Mack et al. ................. | 382/154 |
| 6,381,346 B1 * | 4/2002 | Eraslan ....................... | 382/118 |

FOREIGN PATENT DOCUMENTS

DE  WO 98/43216  * 10/1998

* cited by examiner

*Primary Examiner*—Samir Ahmed
(74) *Attorney, Agent, or Firm*—Cohen, Pontani, Lieberman & Pavane

(57) ABSTRACT

A user recognition system that utilizes two CCD cameras to obtain two images of the user from two different angles of view. A three-dimensional model of the user's face is created from the obtained images in addition. The generated model and an additional facial texture image of the user are compared with a stored user profile. When the obtained 3D model and facial texture information matches the stored profile of the user, access is granted to the system.

19 Claims, 7 Drawing Sheets

METHOD AND APPARATUS FOR USER RECOGNITION USING CCD CAMERAS

BACKGROUND OF THE INVENTION

1. Field of the Invention

The present invention relates to recognition systems, and more particularly to a method and apparatus for user recognition to grant access to computer systems using charged coupled device (CCD) cameras.

2. Description of the Related Art

Computer systems often have password-based recognition systems for identifying the user and their authorization to access the system. The passwords are generally user selected and provide a "what you know" type strategy to access the system, i.e., if you know the password you can access the system. These password systems are relatively unreliable because the user may disclose it to anyone else, either intentionally or unintentionally, so they may access the particular computer system and/or service provided by the same. In addition, a user may write down his password so as to not forget it, thereby providing the opportunity for anyone to find and use it. A password is easily learned by actual disclosure or by being viewed by another while the user is typing it in to access the system. Thus, it is clear that a written password is a large security risk as it may provide several people with access to a system that only one person has been authorized to use.

A more secure recognition system focuses on who the user is, i.e., characteristics of the user, as opposed to what the user knows. It would therefore be preferable to provide a recognition system that is not based on what the user knows, but rather is based on who the user is.

One example of a method of determining who the user is, is fingerprint identification systems. These systems require the user to place their finger or hand on a dedicated scanner which will scan the finger or handprint of the individual and compare the scanned print with those stored in memory. Upon approval of the scanned print, the user will be provided access to the computer system. It is understood that that the level of access provided may be limited or tailored to the specific individual.

Other known systems utilize a single camera that takes a two-dimensional image of the user's face and compares it with stored 2-D images in memory. For example, a system based on Connectix QuickCam is not capable of seeing a 3-dimensional object and therefore are limited to 2-dimensional applications. Thus, it is apparent that the primary drawback of such security system is that it must be capable of handling a 2-D photograph of the authorized user.

Thus, it would be desirable to provide a user recognition system that is capable of using 3-dimensional models of the user, and would therefor provide a more secure system.

SUMMARY OF THE INVENTION

It is therefore an object of the invention to provide a method by which the user's identity is recognized by the system being accessed without requiring the user to input a password.

It is yet another object of the invention to provide a method for recognizing a user's identity for enabling access to a computer system that is based on a who the user is rather than what the user knows (i.e., an input password).

These and other objects are achieved in accordance with the method for recognizing a user of the present invention wherein at least two 2-dimensional still images of the user are obtained from at least two different angles of view. A 3-dimensional model of the user's face is then generated using the obtained images and the user's facial shape is determined using the generated 3-dimensional model. The determined facial shape is compared with user profile information stored in memory. The user profile information includes data relating to the facial shape of authorized users. The comparison with the stored user profile information results in a determination as to whether the determined facial shape matches the profile information stored in the memory. Access to the system is granted when it is determined that the obtained facial shape information matches that of a stored authorized user's profile.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denoted similar elements throughout the several views.

DETAILED DESCRIPTION OF THE PRESENTLY PREFERRED EMBODIMENTS

Figure 1:
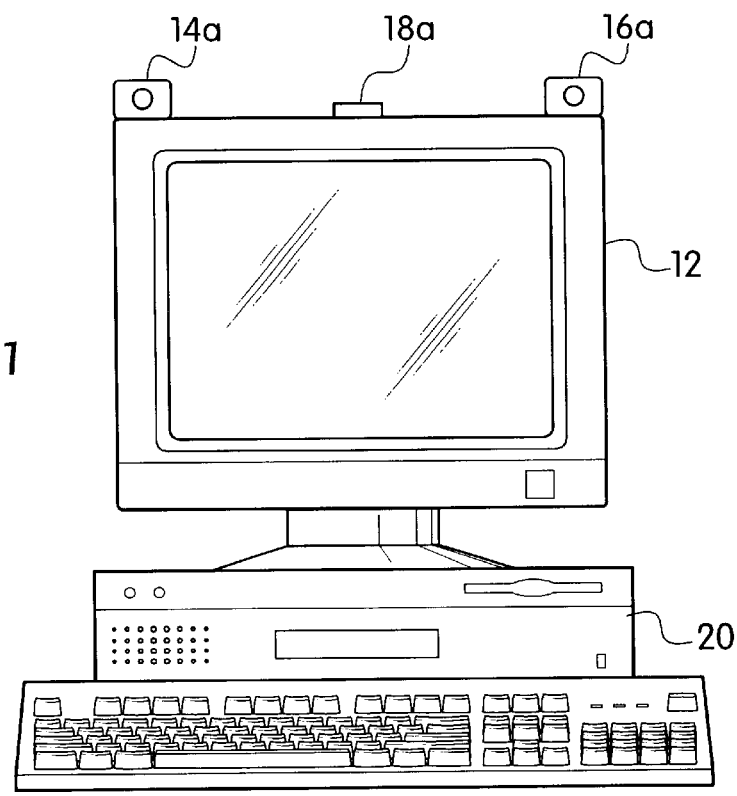
FIG. 1 is a front view of a display monitor having recognition cameras according to an embodiment of the invention.

FIG. 1 shows a first embodiment of the user recognition system according to the invention. In this embodiment, the display monitor 12 includes a light source 18a and two charged couple device (CCD) cameras 14a and 16a. Cameras 14a and 16a may be any other suitable known camera, such as, for example, digital still or video cameras. The light source 18a projects a structured light onto the target, which in this case is the user's face as they are situated in front of display 12. The use of structured light projected onto the user's face facilitates the facial reconstruction process and makes such process more reliable by providing an accurate frame of reference in the imaging system. A computer or central processing unit can be local to display monitor 12 or can be part of a network of connected computers. Cameras 14a and 16a and light source 18a are connected to the computer 20 (either directly, or indirectly through a network of connected computers—e.g., a local area network, or a global network such as the internet).

In another embodiment, the camera's and light projection apparatus may be incorporated into a hand held device such as, for example, a mobile telephone, a personal digital assistant (PDA). One of ordinary skill will recognize that current 3 dimensional scanning circuitry is small enough for incorporation into such devices and may be used as the imaging cameras for such hand held apparatus. The hand held device is capable of communication with a global network of computers (e.g., internet), either through wireless or wired protocol, such that processing of the received image and 3-dimensional reconstruction can be performed and re-transmitted to the hand held device.

Figure 2:
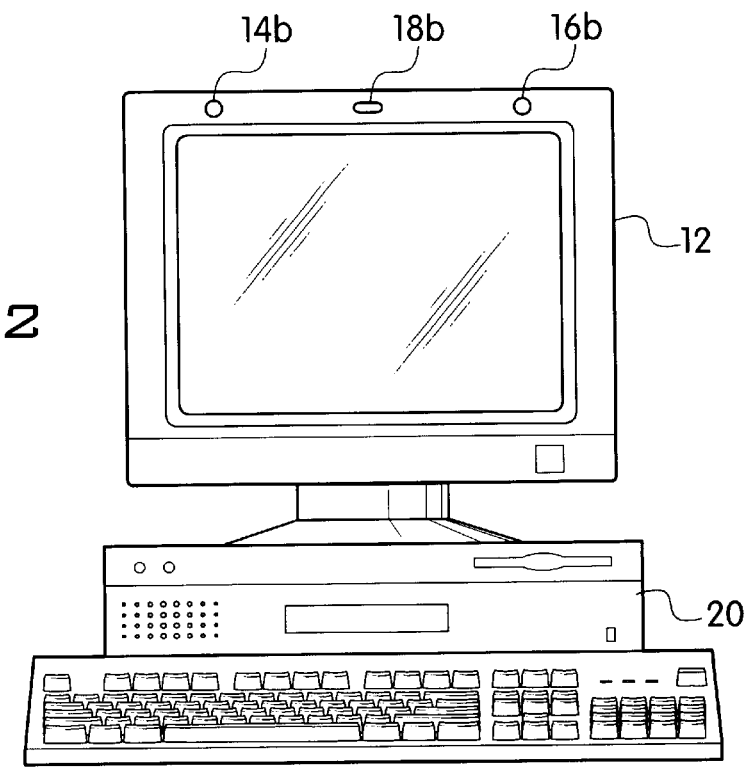
FIG. 2 is a front view of a display monitor having recognition cameras according to another embodiment of the invention.

FIG. 2 shows another embodiment in which cameras 14b and 16b and light source 18b are integrated into the display monitor itself. Computer 20 includes a memory that can be any suitable memory storage device capable of retaining user profile information that includes 3-dimensional images of the user's face and facial texture information relating to the authorized users of the system. Examples of suitable memory devices would include random access memory (RAM), read only memory (ROM), erasable programmable read only memory devices (EPROMS), and any other magnetic or optical media such as hard and floppy disk drives or CD-ROMS (read only, recordable, writable or otherwise).

Figure 6:
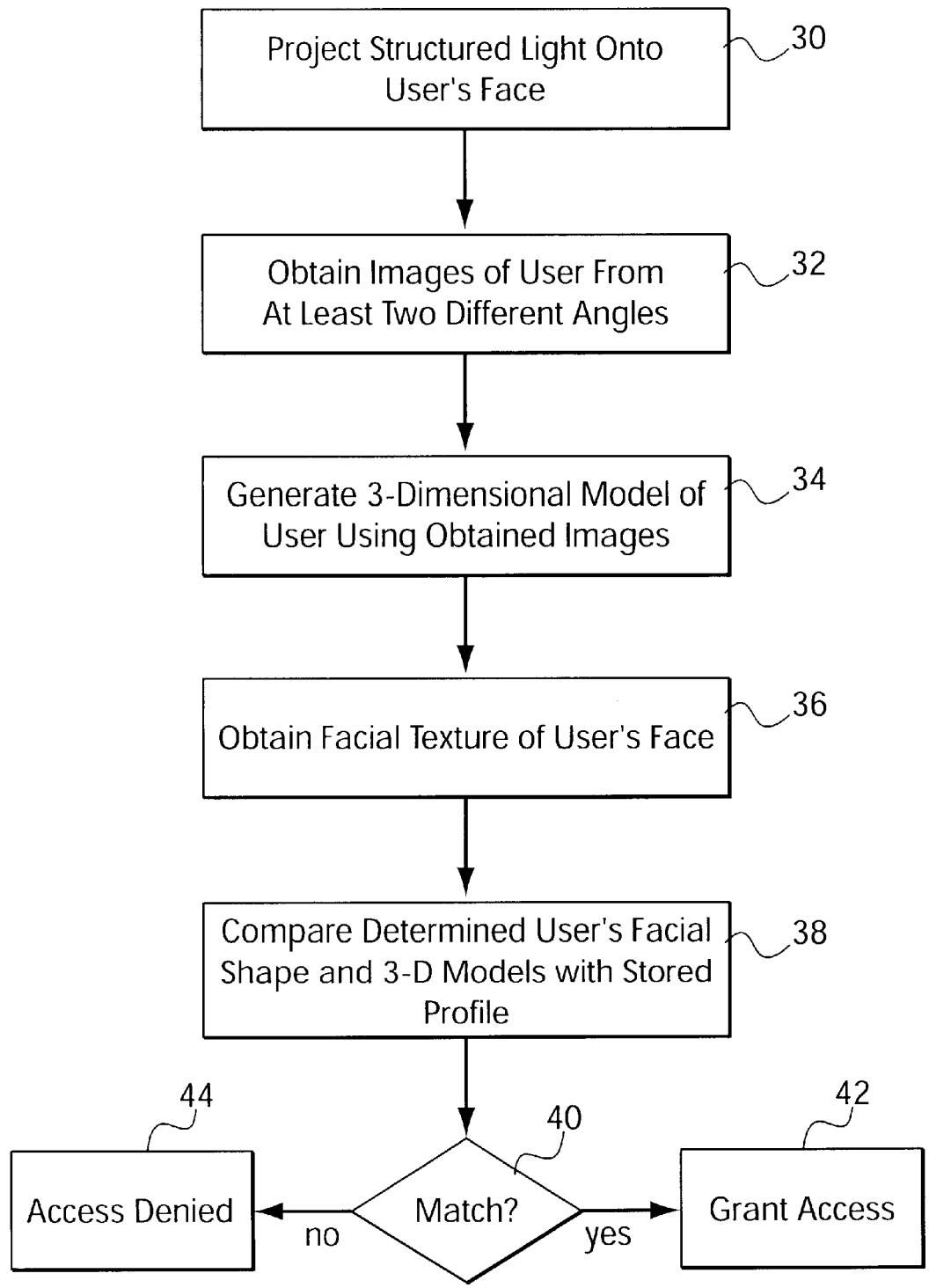
FIG. 6 is a flow diagram illustrating the method of recognizing an authorized user according to the invention.

FIGS. 1 and 2 show the respective cameras 14a, 16a and 14b, 16b on opposing sides of display 12. In accordance with an embodiment of the invention, the cameras should be aligned in the same horizontal plane with respect to each other. The vertical position of the cameras with respect to the display is not of integral importance and may be changed provided both cameras remain on the same horizontal plane, and the angles at which the still images are obtained by the cameras are slightly different with respect to the user being imaged. As the two cameras are placed in different places along the same horizontal plane, the points closer to the camera (i.e., on the user's face) appear to move left and right in the images, more than the points that are placed closer to the background of the user. Other contemplated embodiments may use a single camera capable of movement between two predetermined points for obtaining images at two predetermined angles of view. It is important that camera's 14a, 16a, and 14b, 16b are positioned so that the user's face is within the focusing area of the respective cameras when in a position to access the system. The cameras may also be provided with horizontal, vertical and zooming capabilities in order to enable accurate obtaining of the images of the user's face. The operation of cameras 14a, 14b and 16a, 16b and light source 18a, 18b will be described in conjunction with the flow diagram of FIG. 6.

Upon activation of the computer 20, or upon detection of an attempt to access computer 20 of privileged information contained thereon, light source 18a, 18b projects structured light onto the user's face (step 30) and each camera 14a, 14b and 16a, 16b obtains an image of the user's face from its respective angle point of view (step 32). Structured light is a grid of light that provides image reference points for use in the surface reconstruction of the 3-dimensional model of the user's face. According to the invention, the structured light may be generated by any light source capable of being imaged (i.e., seen) by a CCD camera. Examples of such light are, LASER light, visible white light, and infrared light. When using LASER or infrared, consideration must be made as to the effect, if any, the projected light may have on the user's eyes. Low levels and durations of LASER light and infrared light are not dangerous to a person's eyes, and as such provide other light source alternatives.

Figure 3A:
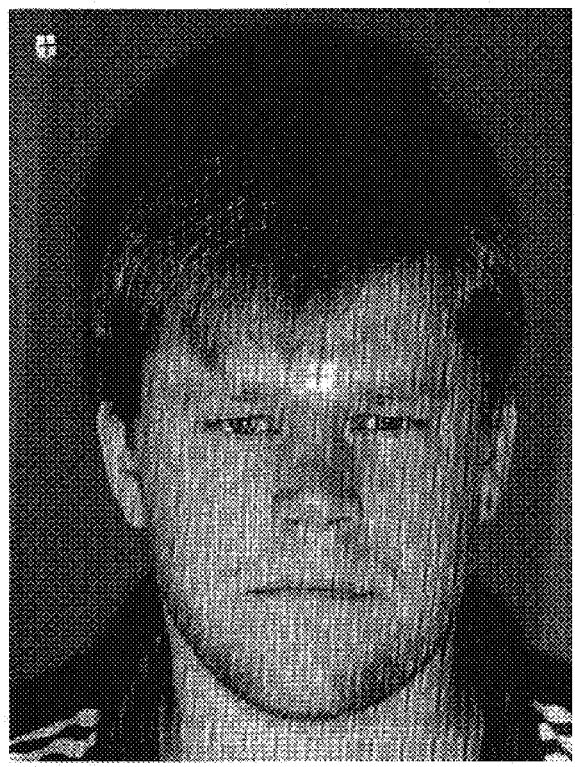
FIG. 3a is a picture of a user taken by one of the cameras with a projected light according to an embodiment of the invention.
Figure 3B:
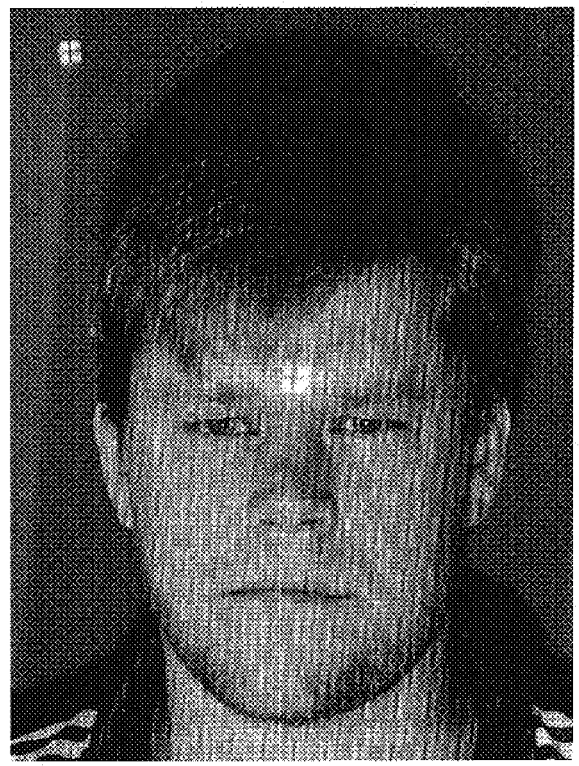
FIG. 3b is a picture of the user taken by the other of the cameras with the projected light according to an embodiment of the invention.

The use of structured light also prevents the possibility of trying to use mirrors and two-dimensional photographs in an attempt to fool the system into thinking the authorized user is present. The structured light prevents such attempts by bending with the 3-dimensional contours of the user's face. When mirrors and 2-D photos are used, the structured light will not bend on the contours of the user's face, thereby indicating to the system that the user is not, in fact, sitting in front of the computer. The two cameras take photos of the user from two different predetermined angles with a slight delay between the first and second image obtained. This delay is dependent on the camera systems used, and for example when using a video camera, may be decreased to only a few milliseconds. FIGS. 3a and 3b show the first and second images, respectively, obtained with the structured light projected onto the user's face.

Figure 4A:
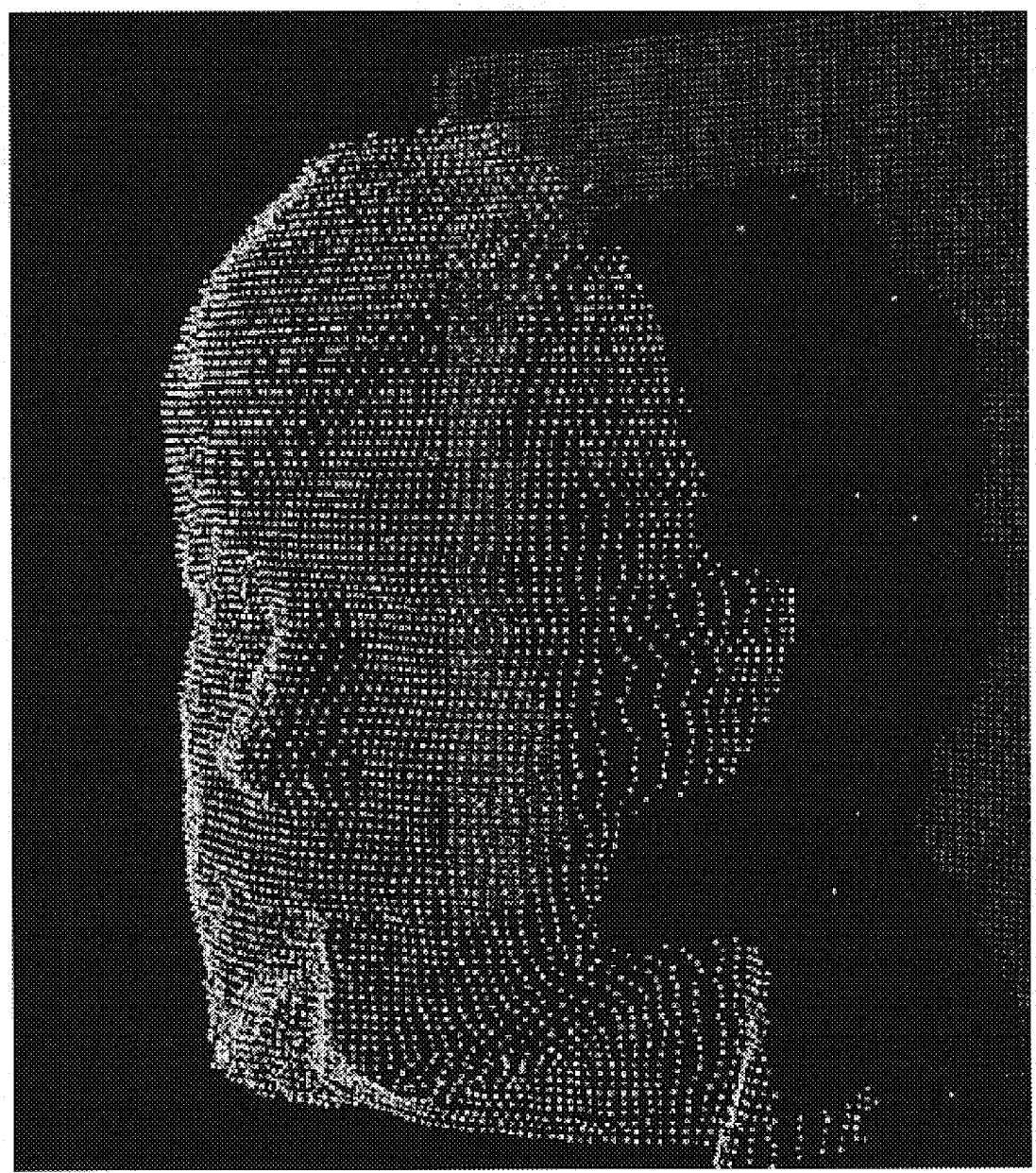
FIGS. 4a, 4b and 4c are three-dimensional representations of the surface reconstruction of the user's face shown as a cloud of data points from various angles.
Figure 4B:
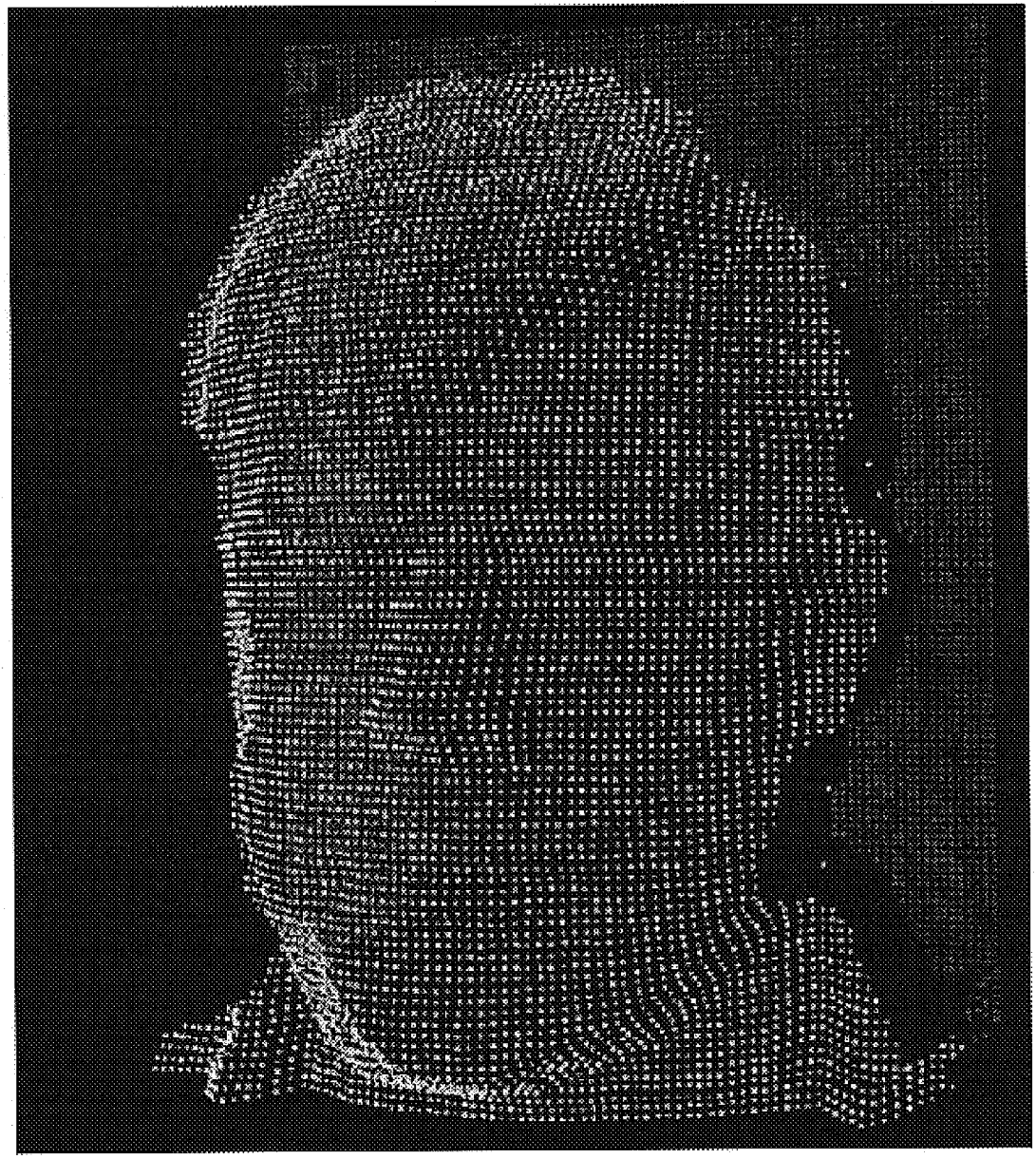
Figure 4C:
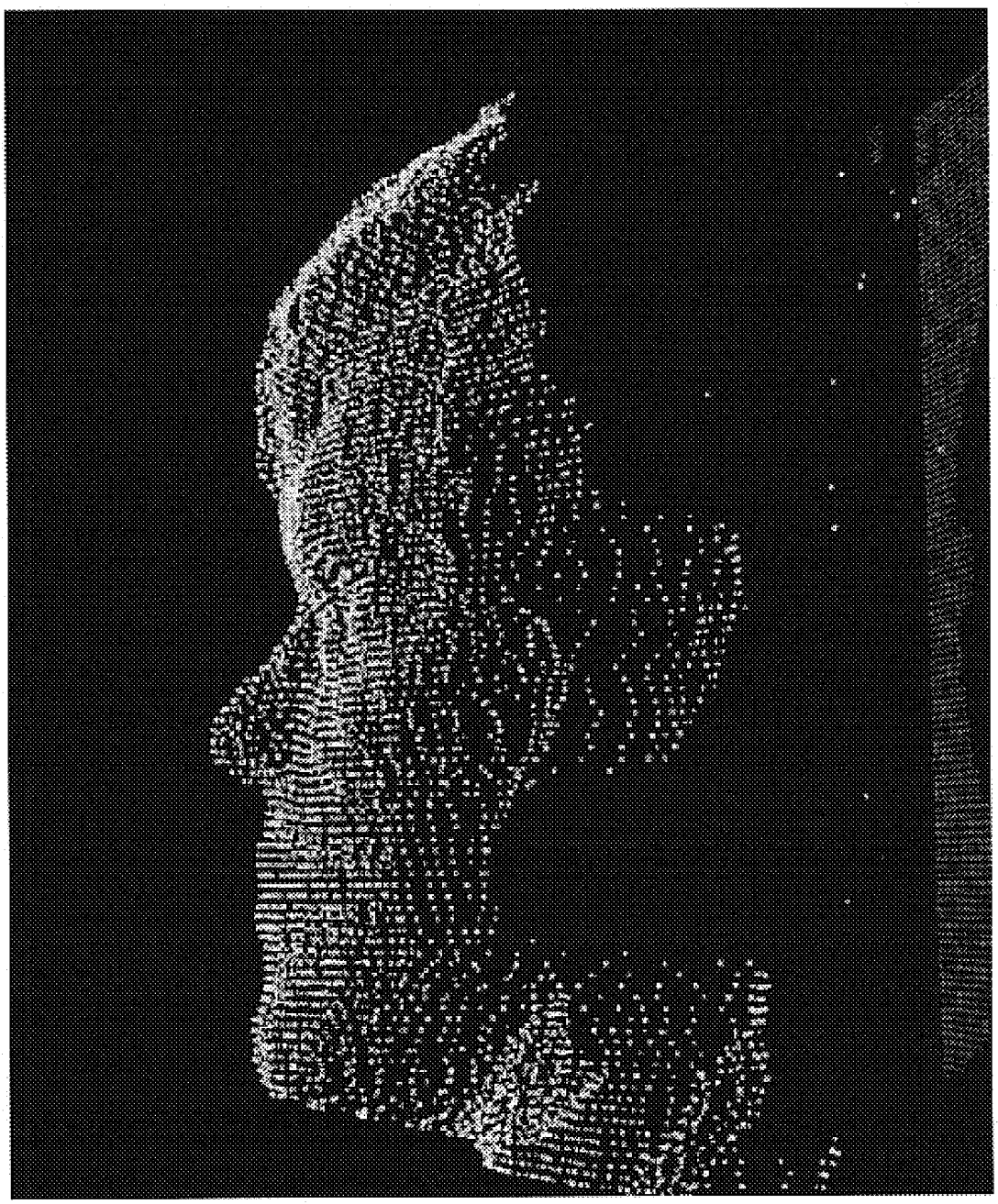

Once the images are obtained at step 32, the computer 20 or other processing device generates a 3-dimensional model of the user's head (step 34). The process of generating a 3-dimensional model therefrom is referred to as surface reconstruction. The 3-dimensional model generated at step 34 is performed using any suitable known surface reconstruction algorithm. Examples of such surface reconstruction techniques can be found in U.S. Pat. Nos. 5,202,928, 5,671,343, 5,694,483 and 5,819,016, each which are incorporated herein by reference. FIGS. 4a–4c show the result of the surface reconstruction as a cloud of data points. The accuracy obtained in the cloud of data points can be user prescribed to be better or worse depending on the usable processing power (e.g. of computer 20) and the level of accuracy desired.

Figure 5:
FIG. 5 is a normal picture of the user's face used to obtain facial texture of the user.

Once the 3-dimensional model has been generated, a normal picture is taken of the user's face (FIG. 5) which provides a facial texture bit map representation of the user. The 3-D model and the facial texture, information of the user are then compared with a previously created user profile stored in a memory contained within computer 20 (step 40). If the 3-dimensional data points match the points in the profile accurately enough and the facial texture bit map sufficiently matches the stored profile, access is granted (step 42) to the system or specific files. If the comparison does not result in sufficiently positive identification of the user, access is denied (step 44).

Other features of the present invention may include a profile adjustment procedure performed during the match step 40. An example of when such adjustment would be necessary would be when the user's facial shape has changed for reasons such as, gaining weight or aging. In these instances, the user's profile may be updated during the match step to ensure correct recognition of the user for future applications. For example, every time the user is granted access, the system will record the newly scanned model and add it to the previous stored profile such that the current stored profile is an averaged profile. Thus, the stored profile will evolve with the changes in the user's appearance, and therefore never deny access if the change in the user's appearance is not too far from the average profile stored. In the event that the user's appearance has changed drastically since their last access attempt, for example, if the user has gained 100 pounds, they will be required to contact a system administrator for purposes re-programming the system to recognize the user and store a new profile for the user.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method for recognizing a user comprising the steps of:

obtaining at least two 2-dimensional still images of the user from at least two different angles of view;

generating a 3-dimensional model of the user's face from the obtained images;

determining the user's facial shape using the generated 3-dimensional model;

comparing the determined facial shape with profile information stored in memory, the profile information comprising data relating to the facial shape of authorized users;

determining whether the determined facial shape matches the profile information of any of the authorized users stored in the memory;

granting access to a system when the determined facial shape matches the profile information of one of the authorized users stored in the memory, thereby indicating recognition and authorization of the user; and updating the profile information of the one of the authorized users with the determined facial shape after each occurrence of said step of granting access such that the updated profile information is an average of the profile information previously stored in memory and the determined facial shape.

2. The method set forth in claim 1, wherein said step of obtaining at least two 2-dimensional still images further comprises:

providing two cameras directed at the user's face;

providing a light source for projecting structured light onto the user's face; and capturing the at least two still images using the cameras.

3. An apparatus for recognizing a user's identity during an attempt to access a system, comprising:

at least one charged coupled device (CCD) camera adapted to obtain at least two still images of the user's face from at least two different predetermined angles of view and to obtain at least one still image of the user's face;

a light source for projecting structured light on the user's face for use in obtaining said at least two still images of the user'face;

memory means for storing user profile information relating to authorized users of a system; and processing means connected to said at least one CCD camera and said light source for generating a 3-dimensional model of the user's face using the at least two still images, and for generating a facial texture bit map of the user's face using the at least one still image, said processing means comprising means for comparing the 3-dimensional model and the facial texture bit map to the stored user profile information contained in said memory means, means for enabling access to the system when the generated 3-dimensional model and facial texture bit map match a user profile stored in said memory means and means for updating the user profile information with the 3-dimensional model, wherein the updated user profile information is an a average of the previous user profile information and the 3-dimensional model.

4. The method set forth in claim 1, wherein said step of determining whether the determined facial shape matches the profile information further comprises denying access to the computer system when the user's determined facial shape does not match any of the profile information stored in memory.

5. The method set forth in claim 2, further comprising the steps of:

obtaining at least one additional 2-dimensional still image of the user's face; and generating a facial texture bit map of the user's face using the obtained 2-dimensional still image, wherein said step of comparing further comprises comparing the generated facial texture bit map with the user profile information stored in the memory.

6. The method set forth in claim 1, wherein said step of generating a 3-dimensional model is performed using a surface reconstruction algorithm.

7. The method set forth in claim 1, wherein said step of obtaining is performed by a charged couple device (CCD) camera capable of movement between two predetermined positions.

8. The method set forth in claim 1, wherein said step of obtaining is performed by at least two charged couple device (CCD) cameras.

9. The method set forth in claim 1, wherein said step of obtaining is performed by a digital camera capable of movement between two predetermined positions.

10. The method set forth in claim 1, wherein said step of obtaining is performed by at least two digital cameras.

11. The method set forth in claim 2, wherein said step of obtaining is performed when the user is positioned within a predetermined focusing area of said two cameras.

12. An apparatus for recognizing a user's identity comprising:

a light source for projecting light at the user's face;

a first camera directed toward the user's face and adapted to record at least one still image of the user from a first predetermined angle of view;

a second camera directed toward the user's face and adapted to record at least one still image of the user from a second predetermined angle of view;

memory means for storing user profile information relating to authorized users of a system; and processing means connected to said light source and said first and second cameras for processing the still images obtained by said cameras and generating a 3-dimensional model of the user's face and for comparing the generated model with the stored user profile information to determine whether the user is authorized to access a system, said processing means comprising means for granting access to the system when the generated model matches the profile information of one of the authorized users stored in the memory means, thereby indicating recognition and authorization of the user, and means for updating the profile information of the one of the authorized users with the generated model after each grant of access by said means for granting access such that the updated profile information comprises an average of the generated model and the previously stored profile information.

13. The apparatus in accordance with claim 12, wherein said light source projects structured light onto the user's face to facilitate the generation of the 3-dimensional model.

14. The apparatus in accordance with claim 12, wherein said first and second cameras comprise charged couple device (CCD) cameras.

15. The apparatus in accordance with claim 12, wherein said first and second cameras comprise digital cameras.

16. The apparatus in accordance with claim 12, wherein said memory means comprises at least one selected from a group consisting of RAM, ROM, EPROM and a magnetic storage media.

17. The apparatus in accordance with claim 12, wherein said processing means comprises a computer, said memory means being contained within said computer.

18. The apparatus in accordance with claim 12, wherein one of said first and second cameras is adapted to obtain a 2-dimensional still image of the user's face, wherein the obtained 2-dimensional still image of the user's face is used to determine the user's facial texture, the determined facial texture being used in conjunction with the generated 3-dimensional model to determine whether the user is authorized to access the system.

19. The apparatus in accordance with claim 13, wherein said light source comprises at least one selected from a group consisting of white light, Laser light and infrared light.

* * * * *